(12) United States Patent
Jun

(10) Patent No.: US 12,353,089 B2
(45) Date of Patent: Jul. 8, 2025

(54) LIGHT ROUTE CONTROL MEMBER AND DISPLAY HAVING THE SAME

(71) Applicant: LG INNOTEK CO., LTD., Seoul (KR)

(72) Inventor: Sung Gon Jun, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 530 days.

(21) Appl. No.: 17/755,659

(22) PCT Filed: Oct. 20, 2020

(86) PCT No.: PCT/KR2020/014284
§ 371 (c)(1),
(2) Date: May 4, 2022

(87) PCT Pub. No.: WO2021/091120
PCT Pub. Date: May 14, 2021

(65) Prior Publication Data
US 2022/0350132 A1   Nov. 3, 2022

(30) Foreign Application Priority Data
Nov. 5, 2019   (KR) .................. 10-2019-0140204

(51) Int. Cl.
*G02F 1/1335*   (2006.01)
*G02B 26/08*   (2006.01)

(52) U.S. Cl.
CPC ....... *G02F 1/133509* (2013.01); *G02B 26/08* (2013.01); *G02F 1/1335* (2013.01); *G02B 2207/123* (2013.01)

(58) Field of Classification Search
CPC .. G02B 2207/123; G02B 26/08; G02B 5/003; B32B 3/30; G02F 1/1323; G02F 1/133509; G02F 1/1335
See application file for complete search history.

(56) References Cited

U.S. PATENT DOCUMENTS

2017/0165947 A1* 6/2017 Murakami ................ E06B 9/24
2018/0045876 A1   2/2018 Lee et al.

FOREIGN PATENT DOCUMENTS

| JP | 2014-126654 A | 7/2014 |
|---|---|---|
| KR | 10-2008-0093612 A | 10/2008 |
| KR | 10-2009-0098061 A | 9/2009 |
| KR | 10-2013-0016018 A | 2/2013 |
| KR | 10-2016-0083554 A | 7/2016 |
| KR | 20160083554 A * | 7/2016 |

(Continued)

OTHER PUBLICATIONS

International Search Report dated Feb. 9, 2021 in International Application No. PCT/KR2020/014284.

(Continued)

*Primary Examiner* — Jia X Pan
(74) *Attorney, Agent, or Firm* — SALIWANCHIK, LLOYD & EISENSCHENK

(57) ABSTRACT

An optical path control member according to an embodiment includes: a base substrate defining a first direction and a second direction; and a pattern part disposed on the base substrate, wherein the pattern part includes a plurality of curved regions, and the pattern part extends with a curvature of 0.01 mm to 0.03 mm.

20 Claims, 4 Drawing Sheets

(56) References Cited

FOREIGN PATENT DOCUMENTS

| KR | 10-2017-0021421 A |   | 2/2017 |
|----|-------------------|---|--------|
| KR | 10-2019-0050136 A |   | 5/2019 |
| KR | 10-2019-0054484 A |   | 5/2019 |
| KR | 20190050136 A | * | 5/2019 |

OTHER PUBLICATIONS

Office Action dated Mar. 18, 2023 in Chinese Application No. 202080077095.0.

* cited by examiner

LIGHT ROUTE CONTROL MEMBER AND DISPLAY HAVING THE SAME

CROSS-REFERENCE TO RELATED APPLICATIONS

This application is the U.S. national stage application of International Patent Application No. PCT/KR2020/014284, filed Oct. 20, 2020, which claims the benefit under 35 U.S.C. § 119 of Korean Application No. 10-2019-0140204, filed Nov. 5, 2019, the disclosures of each of which are incorporated herein by reference in their entirety.

TECHNICAL FIELD

An embodiment relates to a light route control member and display having the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may control a movement path of light to block light in a specific direction, and transmit light in a specific direction.

Meanwhile, such the light-shielding film may be applied to a display device such as a navigation device and a vehicle instrument panel in a moving means such as a vehicle. That is, the light-shielding film can be applied to various fields in accordance with various purposes.

The light-shielding film may block light transmitted to a user by changing a path of light by forming a plurality of patterns on one surface of the film.

However, it may be necessary to block light in multiple directions instead of in one direction depending on the application to which the light-shielding film is applied.

In addition, the light-shielding film may include a plurality of patterns for changing the path of light on the transparent substrate in order to control the path of light movement.

When the light-shielding film including these patterns is combined with the display panel, the pattern of the light-shielding film and the pattern of the display panel may be overlapped with each other, and the moiré phenomenon may occur due to the overlapping phenomenon.

Such a moiré phenomenon may be recognized by external users, and may cause a decrease in visibility to the user.

Accordingly, there is a need for a light path control member having a new structure capable of controlling light in multiple directions and inhibiting a moiré phenomenon according to a pattern.

DISCLOSURE

Technical Problem

An embodiment is to provide a light route control member capable of controlling a movement path of light in a plurality of directions and reducing moiré.

Technical Solution

A light route control member according to embodiment includes a base substrate in which a first direction and a second direction are defined and a pattern portion disposed on the base substrate, wherein the pattern portion includes a plurality of variation regions, and the pattern portion extends while having a curvature of 0.01 mm to 0.03 mm.

Advantageous Effects

The light route control member according to the embodiment may control a viewing angle of a user looking at the light path control member.

In detail, the light path control member may control viewing angles in a plurality of directions of a user looking at the light path control member.

That is, the light path control member may include a pattern portion for controlling a light path and blocking light transmission, and the pattern portion may extend in a plurality of directions.

Accordingly, the light path control member according to the embodiment may control paths of light in a plurality of directions.

That is, by controlling the path of the light in the left and right directions with respect to the user looking at the light path control member by the pattern portion extending in a second direction, it is possible to control the viewing angle in the left and right directions of the user.

In addition, by controlling the path of the light in the up and down direction with respect to the user looking at the light path control member by the pattern portion extending in the third and fourth directions, it is possible to control the viewing angle in the up and down directions of the user.

In addition, since the inner surface of the pattern portion, that is, the extension direction is formed while having a certain size of curvature, the shape, size, and spacing of each pattern portion may be uniform. That is, when forming the intaglio part filled with the pattern part, the mold member can be easily released by the curvature, so that the shape, size and spacing of the embossed part and the intaglio part according to the mold release defect can be uniform. Thereby, the shape, size, and spacing of the pattern portions disposed in the intaglio portion can be made uniform.

Accordingly, since the shape, size, and spacing of the pattern portion are uniform as a whole, the shielding and luminance uniformity of the light path control member may be improved.

MODES OF THE INVENTION

Figure 1:
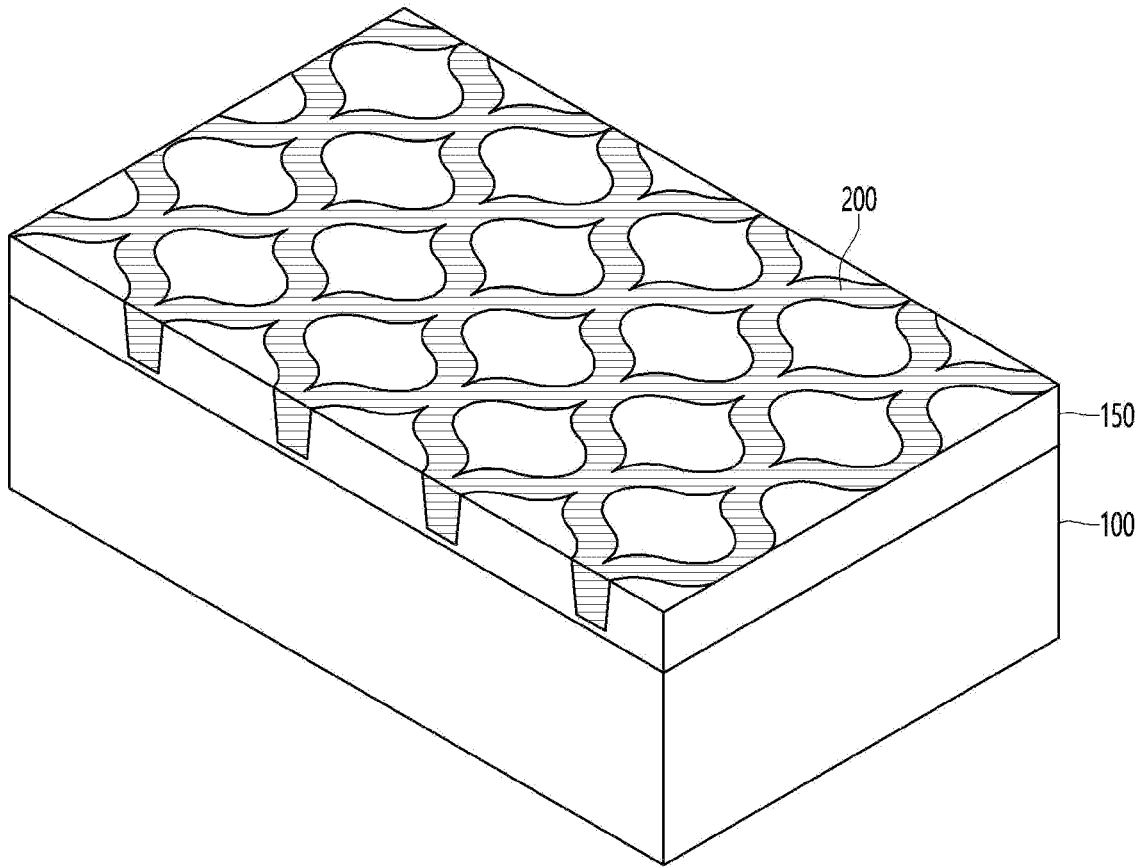
FIG. 1 is a view showing a perspective view of a light route control member according to an embodiment.

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings.

Referring to FIGS. 1 to 5, a light route control member according to an embodiment may include a base substrate 100, a resin layer 150, and a pattern port 200.

The base substrate 100 may include a transparent material. The base substrate 100 may include a flexible material. The base substrate 100 may include plastic.

For example, the base substrate 100 may include a plastic material such as PET (Poly-ester), PMMA (Poly Methyl Meta acryl), PA (Poly Carbonate).

One of the horizontal and vertical directions of the base substrate 100 may be a long side direction, and the other may be a short side direction, and the base substrate may have a rectangular parallelepiped shape. Alternatively, the horizontal and vertical sides of the base substrate 100 may have the same size, so that the base substrate may have a cube shape.

The base substrate 100 may include one surface and the other surface. For example, the base substrate 100 may include one surface and the other surface opposite to the one surface based on the thickness direction of the base substrate 100.

One surface of the base substrate may be defined in a direction viewed by a user. In addition, the other surface of the base substrate may be defined in a direction in which a light source such as a display panel from which light is emitted in the direction of the other surface of the base substrate disposed. That is, light is emitted from a light source such as a display panel disposed on the other surface of the base substrate, and the emitted light is incident on one surface of the base substrate to display a display. Accordingly, the user can visually recognize the display on one surface of the base substrate.

The resin layer 150 may be disposed on the base substrate 100. The resin layer 150 may be disposed in direct contact with the base substrate 100. The resin layer 150 may include a photopolymer such as UV resin or a thermosetting resin.

Alternatively, the resin layer 150 may include the same material as the base substrate 100. For example, the resin layer 150 may be integrally formed with the base substrate 100.

The resin layer 150 may be disposed on the other surface of the base substrate 100. That is, the resin layer 150 may be disposed on the other surface of the base substrate 100 facing the display panel.

The resin layer 150 may include a lower surface 1S and an upper surface 2S. In detail, the lower surface 1S of the resin layer may be defined as a surface adjacent to the other surface of the base substrate 100. Also, the upper surface 2S of the resin layer may be defined as a surface opposite to the lower surface 1S of the resin layer.

Figure 3:
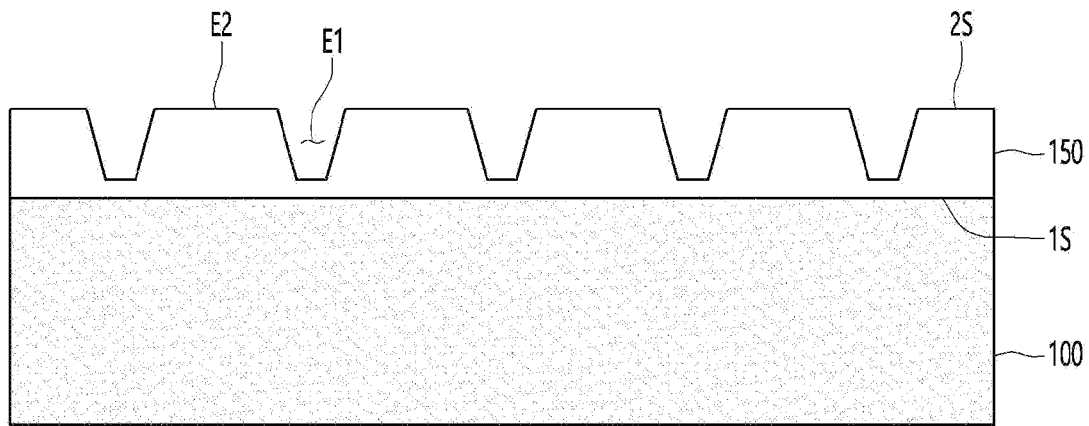
FIG. 3 is a cross-sectional view taken along region A-A' of FIG. 2, showing a cross-sectional view in which ink is not filled in the intaglio part.

Referring to FIG. 3, an intaglio part may be formed on the upper surface of the resin layer 150. In detail, the resin layer 150 may have a plurality of intaglio parts E1 formed to penetrate the upper surface 2S may be formed. That is, the intaglio parts E1 may have a groove shape in which the upper surface 2S is penetrated and the lower surface 15 is not penetrated.

The intaglio portions E1 may be formed by an imprinting process by placing a mold on the upper surface 2S of the resin layer 150. The intaglio parts E1 penetrate the upper surface 2S of the resin layer and are etched to a certain depth, and accordingly, the resin layer may include a plurality of intaglio parts in the shape of a groove having one end open and the other end closed.

Accordingly, the intaglio parts E1 and the embossed parts E2 between the intaglio parts E1 may be formed on the resin layer 150.

The embossed portion E2 may be formed in a dot shape on the resin layer 150. In detail, the embossed portion E2 may be formed in a shape in which the upper and lower surfaces are spherical, and the side surface is a curved surface having a curvature.

Accordingly, the intaglio part E1 formed by the embossed portion E2 may also be formed in a shape in which the inner surface is a curved surface having a curvature.

Figure 2:
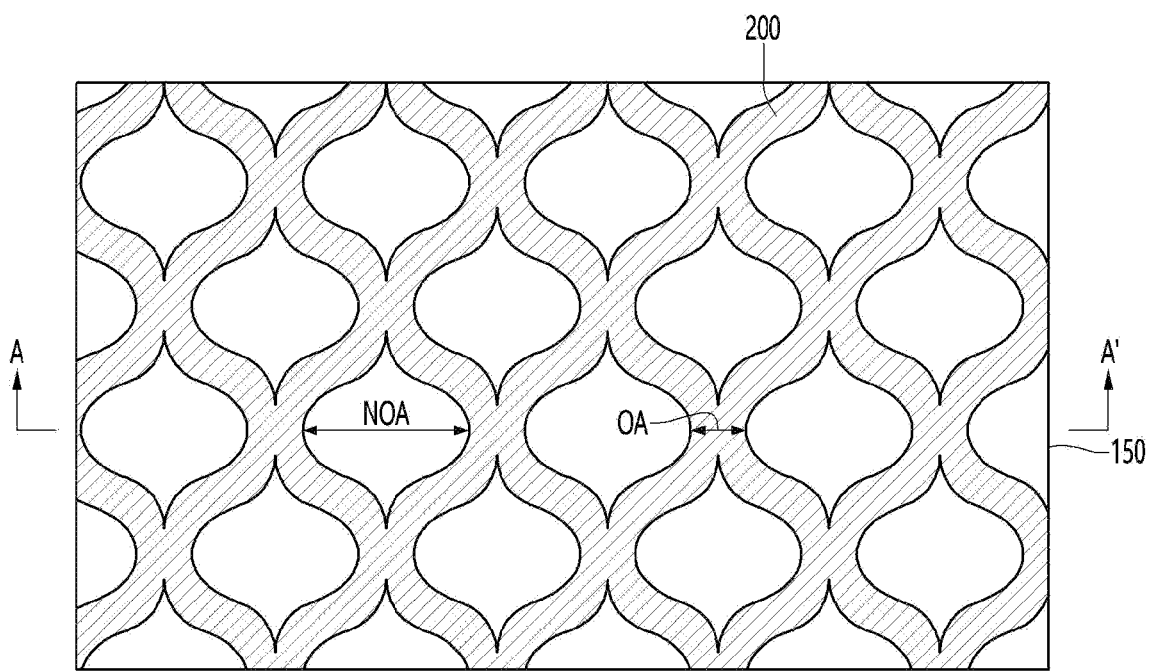
FIG. 2 is a view showing a top view of a light route control member according to an embodiment.
Figure 4:
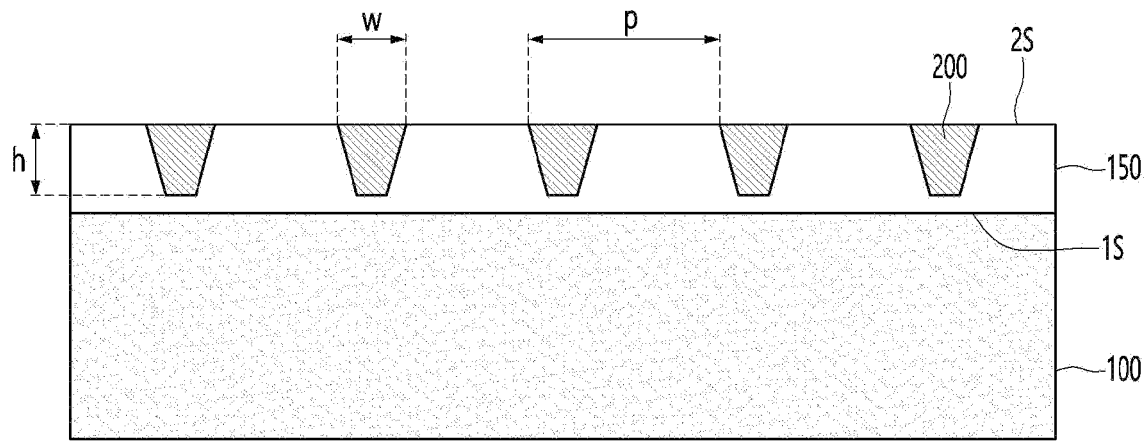
FIG. 4 is a cross-sectional view taken along region A-A' of FIG. 2, showing a cross-sectional view in which ink filled in the intaglio part.

Referring to FIGS. 2 and 4, the pattern portion 200 may be disposed on the base substrate 100. The pattern portion 200 may be disposed on the resin layer 150 on the base substrate 100. In detail, the pattern portion 200 may be disposed inside the intaglio parts formed on the resin layer 150.

The pattern portion 200 is disposed inside each of the plurality of intaglio parts, and accordingly, the pattern portion 200 may include a plurality of pattern parts spaced apart from each other.

The plurality of pattern portions are filled in the intaglio portion E1 formed by the dot-shaped embossed portion E2, and accordingly, the plurality of pattern portions may be connected to each other in the intaglio portion E1.

In FIG. 2, it is illustrated that fewer than 10 pattern portions 200 are provided, but the embodiment is not limited thereto, and several to hundreds of pattern portions 200 may be formed according to the purpose and size of the light path control member.

The pattern portion 200 may include a material having low light transmittance. The pattern portion 200 may include an opaque material. The pattern portion 200 may include a colored material. For example, the pattern portion 200 may include black carbon ink or black carbon beads. That is, the pattern portion 200 may serve as a light blocking function. That is, the pattern portion 200 may be a light blocking pattern.

In addition, the pattern portion 200 and the embossed portion E2 of the resin layer 150 may have different light transmittance. In detail, the light transmittance of the embossed portion E2 of the resin layer 150 may be greater than the light transmittance of the pattern portion 200.

That is, the light incident to the light path control member may be transmitted through the embossed portion E2 of the resin layer 150 and may be blocked by the pattern portion 200.

In detail, the light movement path of the incident light may be changed by the pattern portion 200. That is, the light path control member according to the embodiment partially blocks and partially transmits the incident light, so that the light is transmitted only at a desired angle and at a desired position. That is, the viewing angle of the light may be controlled by the light path control member.

For example, the light path in the up and down directions and the left and right directions with respect to the user may be controlled by the pattern portion 200. That is, depending on the direction in which the pattern portion extends, light exceeding a specific angle in the up and down directions or the left and right directions based on the user's viewing angle may not be transmitted.

For example, when the light path control member according to the embodiment is applied to a vehicle, it is possible to inhibit a virtual image recognized by reflection of light on the left and right windows of the vehicle or the windshield of the vehicle while driving. Accordingly, it is possible to inhibit a virtual image obstructing the view while driving the vehicle, thereby inhibiting the risk of an accident.

A protective layer disposed on the upper surface 2S of the resin layer may be disposed on the resin layer 150. The protective layer may be disposed while covering the pattern portion 200 inside the intaglio portion of the resin layer.

Accordingly, the pattern portion can relieve an external impact by the protective layer, and can inhibit penetration of impurities such as moisture.

In addition, the protective layer may have an adhesive function. That is, the protective layer may include a release film, and may be adhered to each other by removing the release film when bonding the other member and the light path control member.

Referring to FIGS. 2 and 4, the pattern portion 200 of the light path control member according to the embodiment may be disposed to be spaced apart from each other at regular intervals.

That is, as shown in FIG. 2, the pattern portion 200 may include a spaced area NOA and an overlapping area OA. That is, the pattern portion 200 may include a spaced area NOA spaced apart by a predetermined distance by the embossed portion E2 and an overlapping area OA that overlaps in an area where the embossed portion E2 is not disposed.

Referring to FIG. 4, the pitch p of the pattern portion 200 may be about 30 μm or less. In detail, the pitch p of the pattern portion 200 may be about 1 μm to 30 μm. In more detail, the pitch p of the pattern portion 200 may be about 5 μm to 30 μm. In more detail, the pitch p of the pattern portion 200 may be about 9.5 μm to 27.5 μm.

The range of the pitch p of the pattern portion 200 is a range for minimizing moire caused by overlapping between patterns when the light path control member according to the embodiment is combined with another member.

In detail, in the case of the pattern portion 200, it has a directionality extending in a plurality of directions, and, when the light path control member including the pattern portion is combined with the display panel to form a display device, a moire phenomenon may occur due to an overlap between the pattern of the display panel and the pattern of the light path control member.

A user who looks at the display device from the outside may recognize a pattern generated by the moire phenomenon from the outside, and thus, the user's visibility may be reduced.

When the pitch p of the pattern portion exceeds about 30 μm, the pattern according to the moire by the pattern portion of the light path control member and the pattern portion of the other member may be visually recognized from the outside, thereby user's visibility may be reduced.

In this case, the moire reduction effect according to the range of the pitch p of the pattern portion may have an optimal effect when the pitch of the pattern of the other member coupled to the light path control member exceeds about 100 μm.

In detail, the moire reduction effect according to the range of the pitch p of the pattern portion may have an optimal effect when the pitch of the pattern of the other member coupled to the light path control member is 100 μm to 150 μm.

In more detail, the moire reduction effect according to the range of the pitch p of the pattern portion may have an optimal effect when the pitch of the pattern of the other member coupled to the light path control member is 120 μm to 145 μm.

Also, the height h of the pattern portion 200 may be about 120 μm or less. In detail, the height h of the pattern portion 200 may be about 20 μm to about 120 μm. In more detail, the height h of the pattern portion 200 may be about 50 μm to about 100 μm.

The height h of the pattern portion 200 may be defined as a distance from the upper surface of the pattern portion to the lower surface. In detail, the height h of the pattern portion 200 may be defined as a distance from the lowest point of the upper surface to the lowest point of the lower surface.

It is difficult for the height h of the pattern portion 200 to exceed about 120 μm in the process of realization. In addition, since the thickness of the light control member is increased by the height of the pattern portion 200, it is difficult to slim the light path control member. In addition, as the height of the pattern portion 200 increases, the force supporting the pattern decreases, so that the pattern portion may be easily damaged by an external impact. As a result, reliability may be reduced. In addition, when the height of the pattern portion 200 is increased, the width of the pattern portion must be increased in order to improve the force supporting the pattern portion. In this case, the area where the light is blocked becomes too wide, so that the front transmittance is reduced, thereby reducing user visibility.

Also, the height h of the pattern portion 200 may be equal to or less than the inner depth of the intaglio part formed in the resin layer 150. Through this, when the light path control member including the pattern portion 200 and the display device are coupled, poor bonding caused by the pattern exposed to the outside can be inhibited, thereby improving reliability.

Preferably, the pattern portion 200 may be disposed at a height of 90% or more to 100% of the maximum depth of the intaglio part formed in the resin layer 150. In detail, the pattern portion 200 may be disposed at a height of 93% to 100% of the maximum depth of the intaglio part formed in the resin layer 150.

When the pattern portion is formed to be 90% or less of the maximum depth of the intaglio part formed in the resin layer, the resin layer becomes thicker compared to the height of the pattern portion for forming the same shielding function, thereby increasing the thickness of the overall light path control member. In addition, when the pattern portion exceeds 100% of the maximum depth of the intaglio part formed in the resin layer, the ink of the light path control member overflows the upper surface of the embossed portion and is recognized as a stain, thereby reducing the user's visibility. Also, when it is adhered to a display or a protective film, poor bonding may occur.

In particular, the pattern portion of the light path control member according to the embodiment may be disposed at a height of 100% of the maximum depth of the intaglio part. That is, the height of the pattern portion and the depth of the intaglio part may be formed to be the same. Accordingly, an area in which the ink forming the pattern portion is not filled in the engraved part may be removed to improve the light shielding rate, and uniform transmittance and shielding rate may be obtained in the entire area of the light path control member.

In addition, when the height h of the pattern portion is less than about 20 μm, the light blocking effect by the pattern portions may be reduced. In addition, since the height of the pattern portion is too low, it can be seen by other users outside the required viewing angle range, and privacy problems may occur. In addition, a virtual image may be displayed on the windshield or window of the vehicle to obstruct the user's view, and the luminance of light may decrease and the moiré phenomenon may occur at the user's viewing angle due to the dispersion of light.

Also, the pattern portion 200 may have a constant width w. The width w of the pattern portion 200 may be defined as the maximum width of the pattern portion 200 disposed inside the intaglio part E1.

In detail, the width w of the pattern portion 200 may be 25 μm or less. In more detail, the width w of the pattern portion 200 may be 1 μm to 25 μm. In more detail, the width w of the pattern portion 200 may be 3 μm to 15 μm.

The width w of the pattern portion 200 may be related to the light transmittance and light blocking rate of the light path control member. In detail, since the pattern portion 200 serves to block the movement of light, as the width of the pattern portion 200 increases, the light transmittance decreases, but the light blocking rate increases. In addition, as the width of the pattern portion 200 decreases, the light transmittance increases, but, the light blocking rate may decrease.

The width of the pattern portion 200 may be variously changed according to an emission angle of light to be implemented within the above range.

Meanwhile, the pattern portion may be formed such that a width of the pattern portion and a height of the pattern portion satisfy a ratio of about 1:9 to about 1:11.

Accordingly, while maintaining the supporting force of the pattern portion, it is possible to easily control the viewing angle of the pattern portion.

Figure 5:
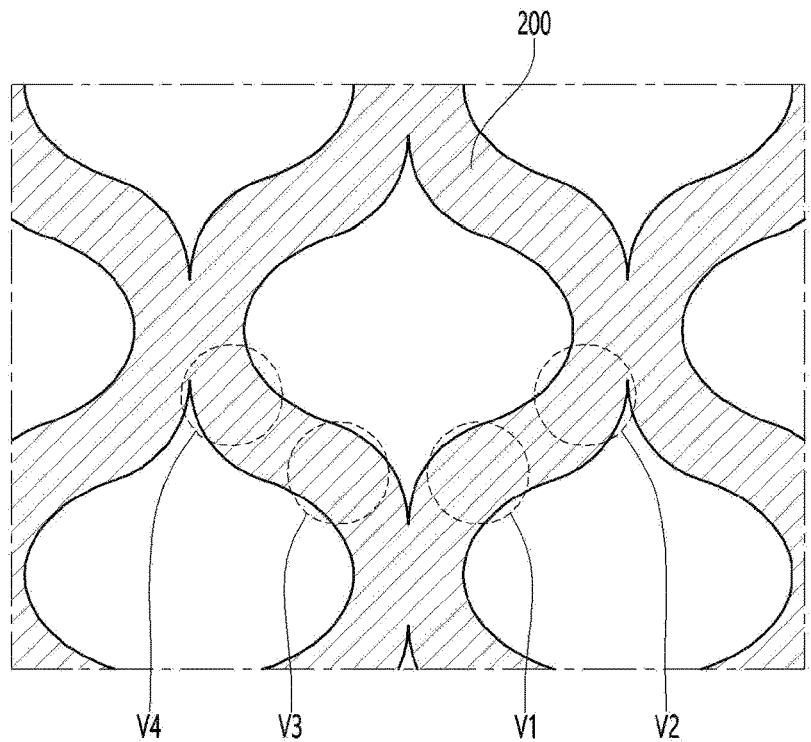
FIG. 5 is a view showing a enlarged view of an area of FIG. 2.
Figure 5:
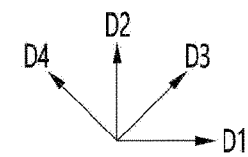

Referring to FIGS. 2 and 5, the pattern portion 200 may be disposed while having a curvature of a certain size. In detail, the inner surface of the pattern portion 200 may be formed as a whole curved surface. That is, the inner surface of the pattern portion 200 in contact with the embossed part E2 may be formed as a curved surface having a certain size of curvature.

The curvature of the inner surface of the pattern part 200 may be determined by the shape of the embossed part E2 in contact with the pattern portion 200. In detail, the size of the curvature of the inner surface of the pattern portion 200 may be formed to have a size corresponding to the curvature of the embossed part E2 formed in the resin layer 150.

The curvature R of the inner surface of the pattern portion 200 and the embossed part E2 may be 0.01 mm to 0.03 mm. That is, the pattern portion 200 may extend in a plurality of directions while having a curvature of 0.01 mm to 0.03 mm. That is, when viewed from the top surface of the light path control member, the pattern portion 200 may extend in a plurality of directions while having a curvature of 0.01 mm to 0.03 mm.

When the curvature R of the inner surface of the pattern portion 200 and the embossed portion E2 is less than 0.01 mm, when the embossed part E2 is formed on the resin layer 150, it is difficult to release the mold member, the shape of the plurality of embossed portions E2 may be non-uniform while releasing the mold member. In addition, when the curvature R of the inner surface of the pattern portion 200 and the embossed part E2 exceeds 0.03 mm, since the shielding effect in one direction becomes too large, it is difficult to implement the shielding effect in multiple directions.

Also, the pattern portion 200 may include a variation region. In detail, the pattern portion 200 may include a plurality of variation regions. That is, the pattern portion 200 may include a plurality of variation regions in which the direction of the pattern portion 200 is changed.

For example, when the horizontal and vertical directions of the base substrate 100 or the resin layer 150 are defined as a first direction D1 and a second direction D2, the pattern portion 200 may extend in a third direction D3 and a fourth direction D4 that are different from the first direction D1 and the second direction D2. In this case, the third direction D3 and the fourth direction D4 may be different directions.

In detail, the pattern portion 200 may extend in the second direction D2, the third direction D3, and the fourth direction D4. In addition, the pattern portion 200 includes a first variation region V1 that changes from the second direction D2 to the third direction D3, a second variation region V2 that changes from the third direction D3 to the second direction D2, a third variation region V3 that changes from the second direction D2 to the fourth direction D4, and a fourth variation region V4 that changes from the fourth direction D4 to the second direction D2

The first variation region V1, the second variation region V2, the third variation region V3, and the fourth variation region V4 may have a curvature of 0.01 mm to 0.03 mm.

Accordingly, the pattern portion 200 may be disposed in a plurality of directions while extending in the second direction D2, the third direction D3, and the fourth direction D4.

Accordingly, the light path control member according to the embodiment may control paths of light in a plurality of directions.

That is, by controlling the path of the light in the left and right directions with respect to the user looking at the light path control member by the pattern portion extending in the second direction, it is possible to control the viewing angle of the user in the left and right directions.

In addition, by controlling the path of the light in the up and down directions based on the user looking at the light path control member by the pattern portion extending in the third direction and the fourth direction, it is possible to control the viewing angle of the user in the up and down directions.

In addition, since the inner surface of the pattern portion, that is, the extension direction is formed while having a certain size of curvature, the shape, size, and spacing of each pattern portion may be uniform. That is, when forming the intaglio part filled with the pattern portion, the mold member may be easily released due to the curvature. Thereby, by making the shape, size, and spacing of the embossed part and the intaglio part uniform, the shape, size and spacing of the pattern portion disposed on the engraved part can be uniform.

Accordingly, the shape, size, and spacing of the pattern portion may be uniform as a whole, so that the shielding and luminance uniformity of the light path control member may be improved.

Figure 6:
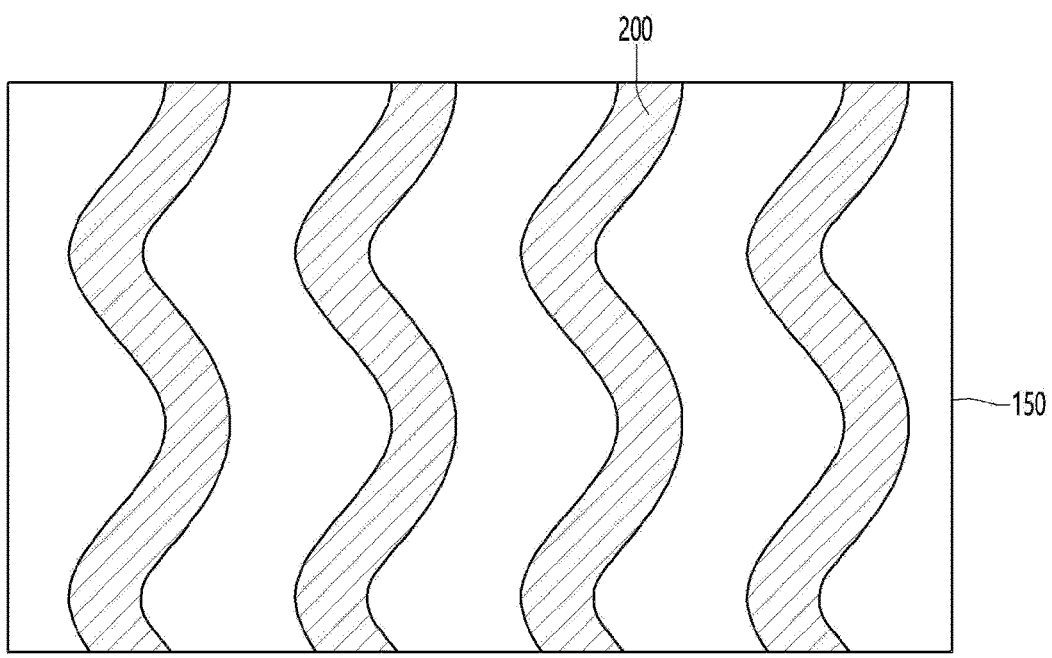
FIG. 6 is a view showing a top view of a light route control member according to another embodiment.

Meanwhile, referring to FIG. 6, the light path control member according to the embodiment may include a plurality of pattern portions.

In detail, the light path control member may include a plurality of pattern portions spaced apart from each other.

The plurality of pattern portions may be disposed to be spaced apart from each other, and each pattern portion may extend in one direction while having a constant curvature.

That is, in FIG. 2, the pattern portions may be formed integrally with each other while including a spaced region and an overlapping region, but in FIG. 6, the pattern portions may be independently disposed while being spaced apart from each other.

In addition, each of the pattern portions includes a plurality of variation regions whose directions change and may extend. That is, each of the pattern portions may include a plurality of variation regions that change in different directions in the same or similar manner to the above-described pattern portions.

Accordingly, each of the pattern portions may be disposed to extend in a plurality of directions, and accordingly, the viewing angles in the plurality of directions may be controlled.

Hereinafter, a display device to which the light path control member according to the embodiment is applied will be described with reference to FIGS. 7 and 8.

Figure 7:
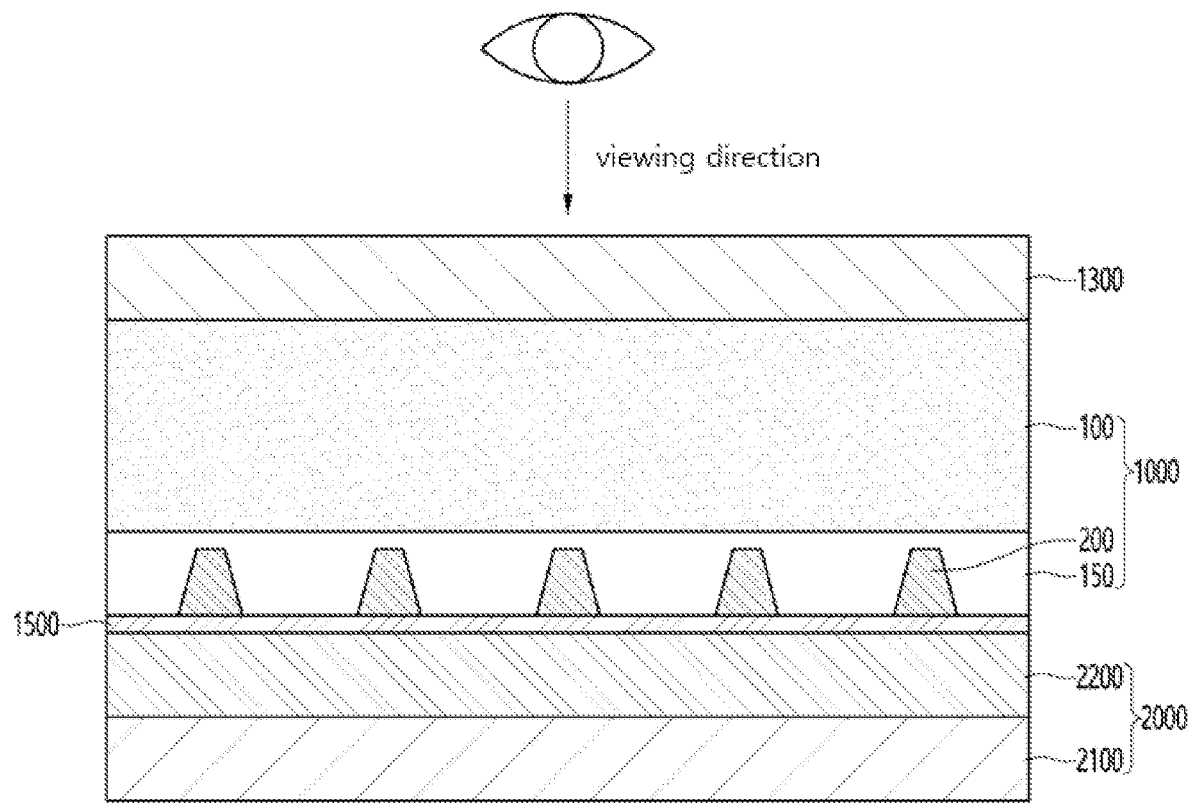
FIG. 7 is a cross-sectional view of a display device to which the light path control member according to embodiments is applied.

Referring to FIG. 7, the light path control member 1000 according to the embodiment may be disposed on the display panel 2000.

The display panel and the light path control member 1000 may be disposed to adhere to each other. For example, the display panel and the light path control member 1000 may be bonded to each other through an adhesive layer 1500 that transmits light. The adhesive layer 1500 may be transparent. For example, the adhesive layer 1500 may include an adhesive or an adhesive layer including an optically transparent adhesive material.

The adhesive layer 1500 may include a release film. In detail, the adhesive layer is disposed while covering the pattern portion on the resin layer 150 of the light path control member, and when adhered to the pattern portion or the display panel, after removing the release film, the pattern portion, the light path control member, and the display panel may be adhered.

Accordingly, when the pattern portion is exposed to the outside by the adhesive layer 1500, the risk of damage can be inhibited. That is, the adhesive layer 1500 may be an adhesive layer and a protective layer.

The display panel 2000 may include a first substrate 2100 and a second substrate 2200. When the display panel 2000 is a liquid crystal display panel, the display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

Alternatively, when the display panel 2000 is an organic light emitting display panel, the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of the base substrate of the light route control member. Although not shown in drawings, the functional layer 1300 may be adhered to the base substrate 100 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

Figure 8:
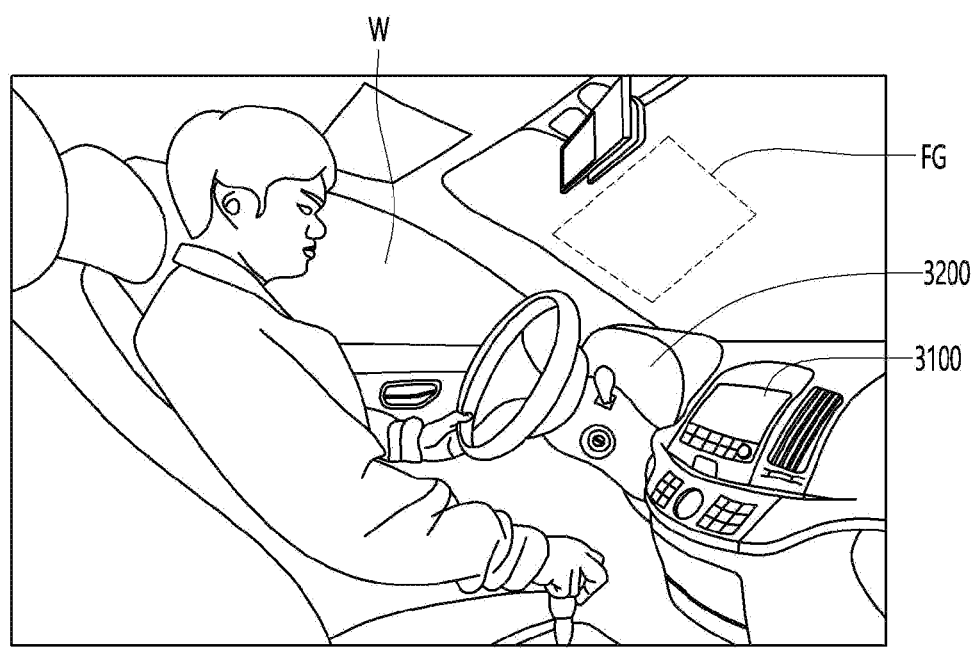
FIG. 8 is a view for explaining an embodiment of a display device to which a light path control member according to an embodiment is applied.

Referring to FIG. 8, the light route control member according to the embodiment may be applied to a vehicle.

Referring to FIG. 8, the display device to which the light path control member according to the embodiment is applied may be disposed inside a vehicle.

For example, the display device including the light route control member according to the embodiment may display a video confirming information of the vehicle and a movement route of the vehicle. The display device 3100 may be disposed between a driver seat and a passenger seat of the vehicle.

In addition, the light route control member according to the embodiment may be applied to a dashboard 3200 that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a base substrate; and
a plurality of pattern portions on the base substrate,
wherein the base substrate comprises a first direction that is a longitudinal direction of the base substrate, a second direction that is a width direction of the base substrate, a third direction that is a right diagonal direction between the first direction and the second direction, and a fourth direction that is a left diagonal direction between the first direction and the second direction,
wherein each of the plurality of pattern portions comprises a first variation region that changes from the second direction to the third direction, a second variation region that changes from the third direction to the second direction, a third variation region that changes from the second direction to the fourth direction, and a fourth variation region that changes from the fourth direction to the second direction,
wherein the plurality of pattern portions include a first pattern portion and a second pattern portion disposed adjacent to each other in the first direction, and
wherein the fourth variation region of the first pattern portion is in direct contact with the second variation region of the second pattern portion.

2. The light route control member of claim 1, wherein each of the plurality of pattern portions extends while having a curvature of 0.01 mm to 0.03 mm.

3. The light route control member of claim 1, wherein the first variation region, the second variation region, the third variation region, and the fourth variation region each has a curvature of 0.01 mm to 0.03 mm.

4. The light route control member of claim 1, comprising a resin layer on the base substrate,
wherein the resin layer includes an intaglio part and an embossed part,
wherein the plurality of pattern portions are disposed inside the intaglio part,
wherein a height of each the plurality of pattern portions corresponds to a depth of the intaglio part.

5. The light route control member of claim 4, wherein each of the plurality of pattern portions is disposed at a height ranging from 90% to 100% of a maximum depth of the intaglio part.

6. The light route control member of claim 1, wherein the plurality of pattern portions include a third pattern portion adjacent to the second pattern portion in the first direction,
wherein the second pattern portion is arranged between the first pattern portion and the third pattern portion, and
wherein the fourth variation region of the second pattern portion is in direct contact with the second variation region of the third pattern portion.

7. The light route control member of claim 6, wherein the plurality of pattern portions are integrally formed.

8. The light route control member of claim 7, wherein each of the first to third pattern portions includes a plurality of first variation regions, a plurality of second variation regions, a plurality of third variation regions, and a plurality of fourth variation regions spaced apart in the second direction,
wherein each of the plurality of second variation regions of the second pattern portion is in direct contact with each of the plurality of fourth variation regions of the first pattern portion, respectively, and wherein each of the plurality of fourth variation regions of the second pattern portion is in direct contact with each of the plurality of second variation regions of the third pattern portion, respectively.

9. The light route control member of claim 6, wherein a pitch between adjacent pattern portions of the plurality of pattern portions is 1 μm to 30 μm, and wherein a height of each of the plurality of pattern portions is 20 μm to 120 μm.

10. The light route control member of claim 6, wherein a width of each the plurality of pattern portions is 1 μm to 25 μm.

11. The light route control member of claim 6, wherein a width of each the plurality of pattern portions and a height of each the plurality of pattern portions satisfy a ratio of 1:9 to 1:11.

12. A display device comprising:

a display panel; and a light route control member disposed on the display panel, wherein the light route control member comprises:

a base substrate; and a plurality of pattern portions on the base substrate, wherein the base substrate comprises a first direction that is a longitudinal direction of the base substrate, a second direction that is a width direction of the base substrate, a third direction that is a right diagonal direction between the first direction and the second direction, and a fourth direction that is a left diagonal direction between the first direction and the second direction, wherein each of the plurality of pattern portions comprises a first variation region that changes from the second direction to the third direction, a second variation region that changes from the third direction to the second direction, a third variation region that changes from the second direction to the fourth direction, and a fourth variation region that changes from the fourth direction to the second direction, wherein the plurality of pattern portions include a first pattern portion and a second pattern portion disposed adjacent to each other in the first direction, and wherein the fourth variation region of the first pattern portion is in direct contact with the second variation region of the second pattern portion.

13. The display device of claim 12, wherein the first variation region, the second variation region, the third variation region, and the fourth variation region each has a curvature of 0.01 mm to 0.03 mm.

14. The display device of claim 12, comprising a resin layer on the base substrate, wherein the resin layer includes an intaglio part and an embossed part, wherein the plurality of pattern portions are disposed inside the intaglio part, wherein a height of each of the plurality of pattern portions corresponds to a depth of the intaglio part.

15. The display device of claim 14, wherein each the plurality of pattern portions is disposed at a height ranging from 90% to 100% of a maximum depth of the intaglio part.

16. The display device of claim 12, wherein the plurality of pattern portions include a third pattern portion adjacent to the second pattern portion in the first direction, wherein the second pattern portion is arranged between the first pattern portion and the third pattern portion, and wherein the fourth variation region of the second pattern portion is in direct contact with the second variation region of the third pattern portion.

17. The display device of claim 16, wherein a pitch of adjacent pattern portions of the plurality of pattern portions is 1 μm to 30 μm, and wherein a height of each of the plurality of pattern portions is 20 μm to 120 μm.

18. The display device of claim 16, wherein each of the first to third pattern portions includes a plurality of first variation regions, a plurality of second variation regions, a plurality of third variation regions, and a plurality of fourth variation regions spaced apart in the second direction, wherein each of the plurality of second variation regions of the second pattern portion is in direct contact with each of the plurality of fourth variation regions of the first pattern portion, respectively, and wherein each of the plurality of fourth variation regions of the second pattern portion is in direct contact with each of the plurality of second variation regions of the third pattern portion, respectively.

19. The display device of claim 16, wherein a width of each of the plurality of pattern portions is 1 μm to 25 μm.

20. The display device of claim 16, wherein a width of each of the plurality of pattern portions and a height of each of the plurality of pattern portions satisfy a ratio of 1:9 to 1:11.

* * * * *